(12) United States Patent
Thomas

(10) Patent No.: US 11,524,635 B2
(45) Date of Patent: Dec. 13, 2022

(54) RETAINER FOR SECURING PERSONAL ELECTRONIC DEVICES ON SEATBACKS

(71) Applicant: Steven Wayne Thomas, Grapevine, TX (US)

(72) Inventor: Steven Wayne Thomas, Grapevine, TX (US)

(*) Notice: Subject to any disclaimer, the term of this patent is extended or adjusted under 35 U.S.C. 154(b) by 431 days.

(21) Appl. No.: 16/717,556

(22) Filed: Dec. 17, 2019

(65) Prior Publication Data

US 2021/0179269 A1 Jun. 17, 2021

(51) Int. Cl.
| | | |
|---|---|---|
| *B60R 11/02* | (2006.01) | |
| *H01F 7/02* | (2006.01) | |
| *B64D 11/00* | (2006.01) | |
| *B60R 11/00* | (2006.01) | |

(52) U.S. Cl.
CPC ........ *B60R 11/02* (2013.01); *B64D 11/00152* (2014.12); *H01F 7/02* (2013.01); *B60R 2011/005* (2013.01); *B60R 2011/007* (2013.01); *B60R 2011/0059* (2013.01)

(58) Field of Classification Search
CPC ....... B60R 2011/005; B60R 2011/0059; B60R 2011/007; B60R 11/02; B64D 11/00152
See application file for complete search history.

(56) References Cited

U.S. PATENT DOCUMENTS

| | | | |
|---|---|---|---|
| 8,393,584 B2 | 3/2013 | Burns | |
| 8,459,599 B2 | 6/2013 | Du et al. | |
| 8,561,863 B2 | 10/2013 | LaColla et al. | |
| 8,706,175 B2 | 4/2014 | Cho | |
| 8,727,290 B1 | 5/2014 | De La Matta et al. | |
| 8,979,044 B2 | 3/2015 | Seidi et al. | |
| 9,010,597 B2 | 4/2015 | Prescott et al. | |
| 9,038,971 B1 | 5/2015 | Guthrie | |
| 9,581,291 B2 | 2/2017 | Trotsky | |
| 2004/0211868 A1 | 10/2004 | Holmes et al. | |
| 2005/0109899 A1 | 5/2005 | Yeh | |
| 2010/0252696 A1 | 10/2010 | Sage | |
| 2010/0294908 A1* | 11/2010 | Mish | F16M 11/041 248/454 |
| 2010/0317418 A1 | 12/2010 | Zanetti | |
| 2012/0118770 A1* | 5/2012 | Valls | F16M 13/00 248/688 |
| 2013/0068915 A1 | 3/2013 | Yang | |

(Continued)

*Primary Examiner* — Derek J Battisti

(74) *Attorney, Agent, or Firm* — Dunlap Bennett & Ludwig, PLLC

(57) ABSTRACT

A portable retainer for securing personal electronic devices on the backs of seats is provided. The portable retainer provides a core having communicating wire holes adjacent each end of thereof, through which an elastic wire protrudes for either hanging from a seatback in an upright hanging position or being supported in a pocket of the seatback in an inverted propped up position. The portable retainer provides front and rear endplates that are peripherally broader than the core for facilitating winding the elastic wire about the core in a stored position. The endplates may provide a slot for magnets, to which anchor plates can removably attach to a desired electronic device in either the hanging or the propped-up positions for viewing the anchored electronic device from selective angles and height, due in part to the rigidly malleable elastic wire.

17 Claims, 4 Drawing Sheets

(56) References Cited

U.S. PATENT DOCUMENTS

| | | | |
|---|---|---|---|
| 2013/0233986 A1* | 9/2013 | Rasheta | F16M 13/022 |
| | | | 248/274.1 |
| 2014/0054338 A1 | 2/2014 | Casagrande | |
| 2014/0346306 A1* | 11/2014 | Mayfield | A47B 23/043 |
| | | | 248/455 |
| 2016/0264244 A1* | 9/2016 | Matsumoto | B64D 11/0015 |
| 2018/0199724 A1 | 7/2018 | Bray | |

* cited by examiner

RETAINER FOR SECURING PERSONAL ELECTRONIC DEVICES ON SEATBACKS

BACKGROUND OF THE INVENTION

The present invention relates to electronic device accessories and, more particularly, to a portable retaining device for securing personal electronic devices on the backs of seats.

More and more, airlines will no longer provide seatback entertainment systems in airplanes. As a result, passengers wanting to view onboard entertainment need to use their personal devices. The space available for using such personal devices, however, is very limited (think: downsized tray tables which must be stowed during taxi, takeoff, and landing).

Existing devices require significant set up time to use. They also tend to intrude on the passenger in the seat of the seatback. In addition, many are designed for specific device types (e.g., mobile phones, or tablets), and so are not 'universal' for any portable electronic device. Furthermore, current devices also do not allow for the adjustment of the viewing angle or otherwise do not provide for selectable multi-positional use, which is important especially when the engaged seatback is in a reclined position. Other devices are bulky and unwieldy; in essence, an inconvenience to bring along when travelling. Current devices have the additional disadvantage of only being usable when the tray table is deployed, and so requiring the passenger to hold the personal device in their hand or lap when also using the tray table.

As can be seen, there is a need for a portable retaining device for securing personal electronic devices on the backs of seats. The portable retaining device embodied in the present invention is adapted to hang over the seatback or be propped up in the seatback pocket of the seat in front of the user, all while eliminating the disturbance to fellow passengers. The present invention employs a rigidly malleable elastic wire or filament, enabling the personal retaining device to be articulated for optimal viewing angle in either a hanging position over the seatback or in an inverted, propped up position in the seatback pocket without losing the ability to adjust the personal device for optimal viewing.

The seatback dimensions on airliners vary in thickness. Importantly, the present invention enables a passenger to removably, temporarily mount their personal electronic device on the seatbacks of various widths in front of them, allowing for hands free viewing of entertainment content when the tray table is deployed and using the deployed tray table for other activities (e.g., meals). The retaining device's size provides sturdy support of electronic devices that are attached even during turbulent flights, while being compact in a stored position, fitting in a 6"×3"×3" space and so storable in briefcases and backpacks.

SUMMARY OF THE INVENTION

In one aspect of the present invention, a retainer for securing an electronic device on a seatback includes the following: a core; two holes in the core, each hole provided adjacent opposing ends of an upper surface the core; a channel slot in a lower surface of the core, wherein the two holes and the channel slot communicate; an elastic wire disposed in the two holes and the channel slot so that the elastic wire protrudes from each hole at least one foot; and one or more magnets attached to a front surface of the core, wherein the elastic wire has a property of taking a new shape and holding said new shape so as to be positioned in a hanging position, a propped-up position, or a stored position wound around the core; a front plate attached to the front surface, wherein the front plate having a plate periphery circumscribing a periphery of the front surface; a magnet slot provided by the front plate; and the one or more magnets housed in the magnet slot; a rear plate attached to a rear surface opposing the front surface, the rear plate coextensive with the front plate, and sandwiching the core there between, wherein certain embodiments, the one or more magnets are four magnets; an adhesive strip attaching a first two of the four magnets to an inner surface of the magnet slot; and a second two of the four magnets magnetically engaged to the first two; a ferromagnetic anchoring plate removably engaging the second two and an electronic device; and two end caps, each end cap for each distal end of the elastic wire.

In another aspect of the present invention, method of removably attaching an electronic device on a seatback in a hanging position off an upper portion of the seatback or in a propped-up position in a pocket of said seatback, includes the following: providing the above mentioned retainer for securing an electronic device on a seatback; either attaching the anchor plate to the electronic device; manipulating the elastic wire into the hanging position having a hook shape at each distal portion; engaging the hook shapes and the upper portion of the seatback; and adjusting the elastic wire to selectively choose a viewing angle of the electronic device; or inserting the hook shapes in the pocket; and adjusting the elastic wire to selectively choose a viewing angle of the electronic device.

And when in no need to secure the electronic device to the seatback, disengaging the hook shape and the upper portion and winding the end portions about the core in the stored position.

These and other features, aspects and advantages of the present invention will become better understood with reference to the following drawings, description and claims.

DETAILED DESCRIPTION OF THE INVENTION

Figure 1:
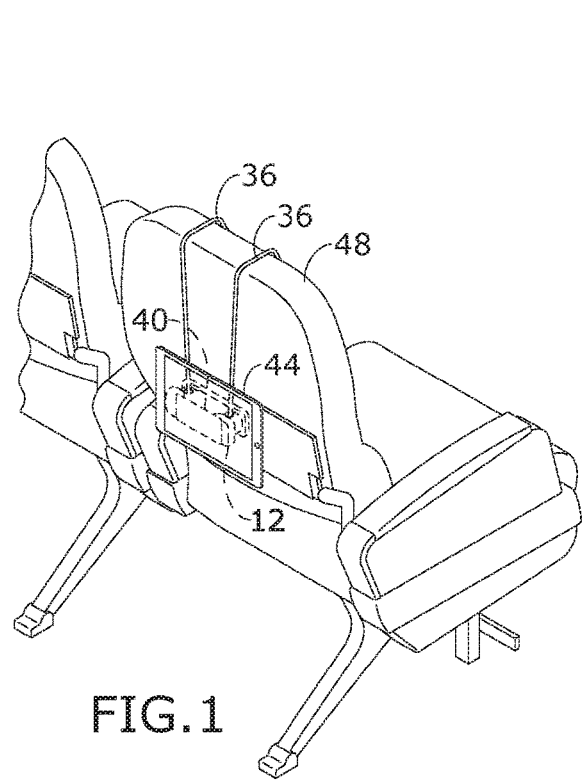
FIG. 1 is a perspective view of an exemplary embodiment of the present invention, shown in use hanging from a seat back in a hanging position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a portable retainer for securing personal electronic devices on the backs of seats. The portable retainer provides a core having communicating wire holes adjacent each end of thereof, through which an elastic wire protrudes for either hanging from a seatback in an upright hanging position or being supported in a pocket of the seatback in an inverted propped up position. The portable retainer provides front and rear endplates that are peripherally broader than the core for facilitating winding the elastic wire about the core in a stored position. The endplates may provide a slot for magnets, to which anchor plates can removably attach to a desired electronic device in either the hanging or the propped-up positions for viewing the anchored electronic device from selective angles and height, due in part to the rigidly malleable elastic wire.

It should be understood by those skilled in the art that the use of directional terms such as upper, lower, outward, inward and the like are used in relation to the illustrative embodiments as they are depicted in the figures. The outward direction being directed away from the core of the present invention shown in the corresponding figures, the inner direction being toward said core in the corresponding figures.

Referring to FIGS. 1 through 9, the present invention may include a personal electronic device seat retainer 100 for removably securing various personal electronic devices 44, 46, etc., to a seatback 48 of a seat immediately in front of a user.

The personal electronic device seat retainer 100 may have a core 10 sandwiched between a front plate 12 and an opposing rear plate 16. The core 10 may be a 3D-printable light weight, strong plastic material with the rough dimensions of 6×3×3 inches, though other dimensions are contemplated herein. A middle portion of the core 10 may provide a protruding beveled surface on the opposing front and rear sides thereof, each protruding beveled surface dimensioned and adapted to abut a front and rear notch 14 and 18, respectively, provided by the respective front and rear plates 12 and 16.

The core 10 may provide a first hole 22 and a second hole 24 in communication with each other, each hole 22 and 24 adjacent each opposing first and second ends of the core 10, respectively. Along a bottom surface of the core 10, a channel void 20 is provided, wherein the channel void 20 extends to a distance defined by the further extents of the first and second holes 22 and 24, and thus the channel void 20 does not extend to the opposing ends of the core 10.

Figure 3:
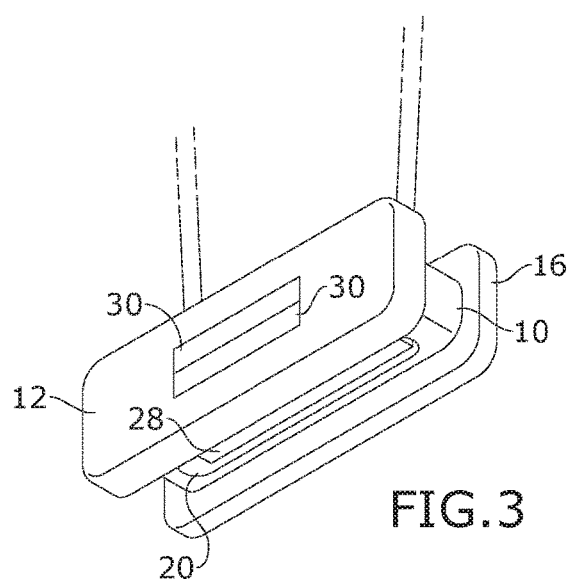
FIG. 3 is a bottom perspective view of an exemplary embodiment of the present invention.
Figure 4:
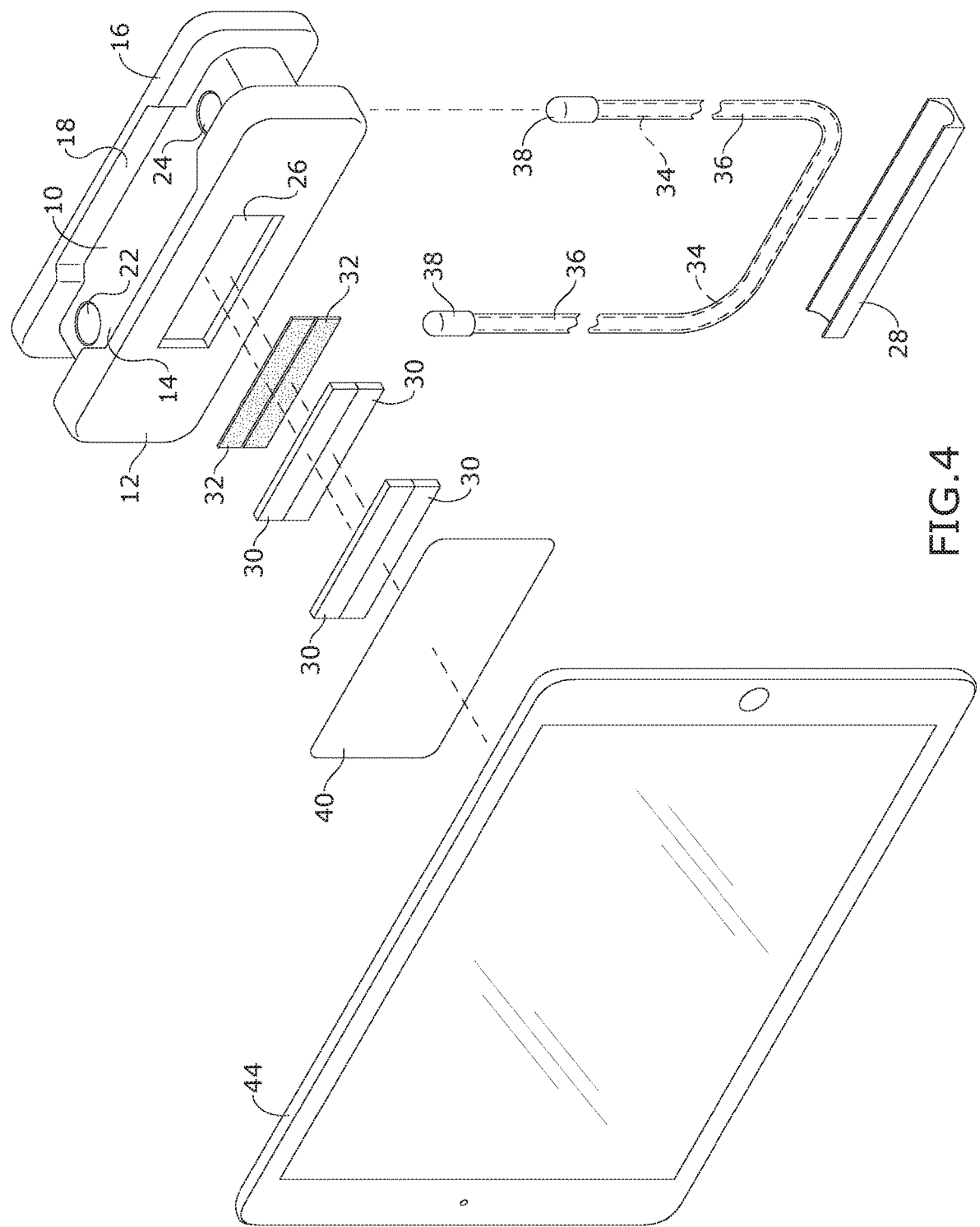
FIG. 4 is an exploded perspective view of an exemplary embodiment of the present invention, demonstrating engagement with an electronic device.
Figure 5:
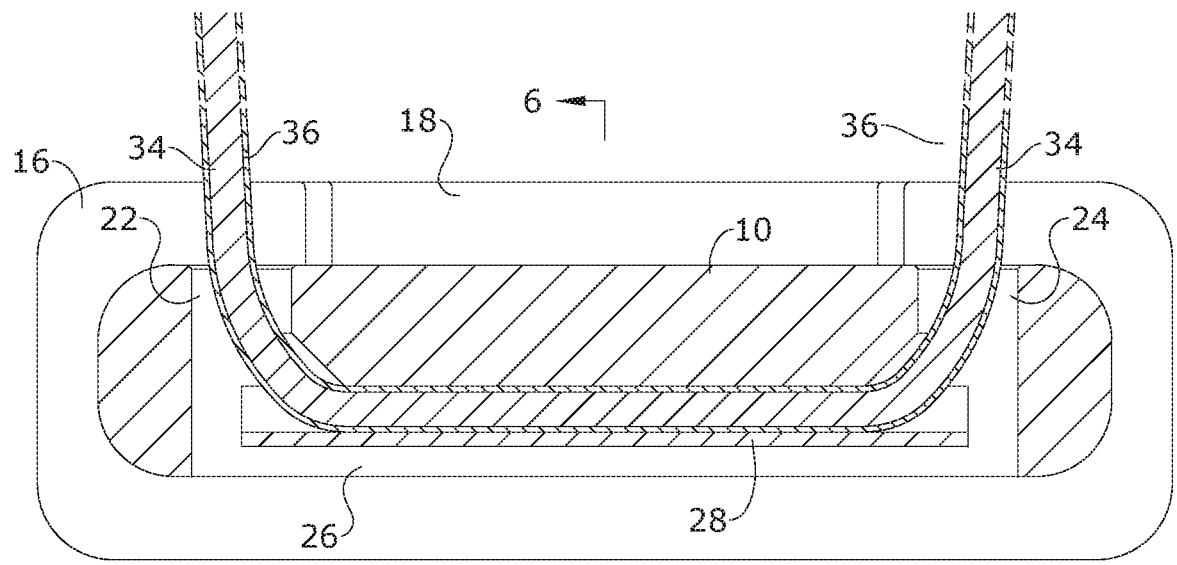
FIG. 5 is a section view of an exemplary embodiment of the present invention, taken along line 5-5 of FIG. 2.
Figure 6:
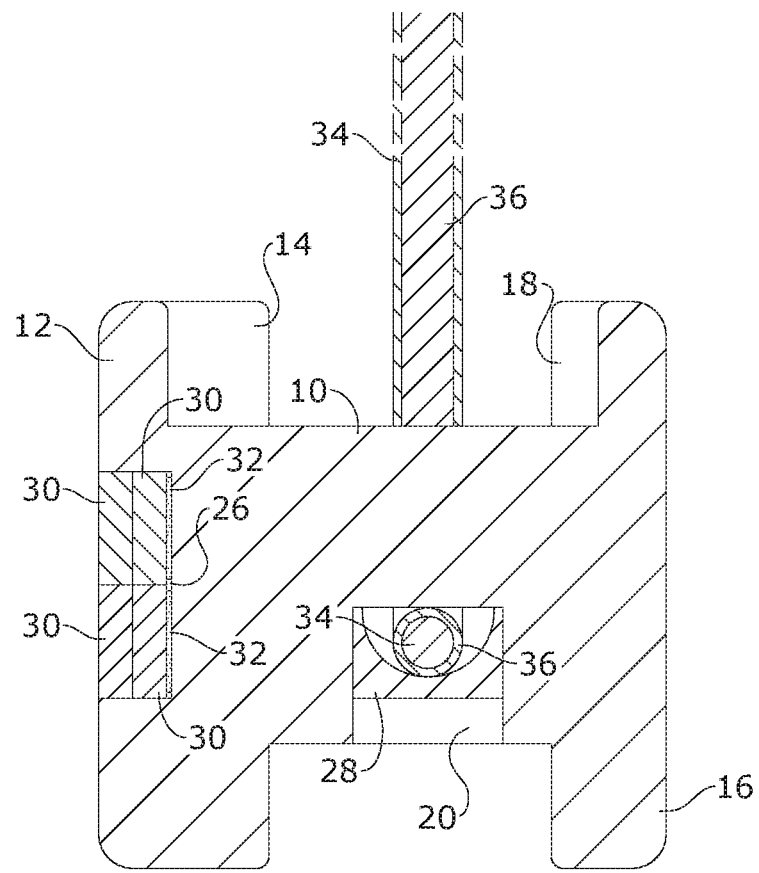
FIG. 6 is a section view of an exemplary embodiment of the present invention, taken along line 6-6 of FIG. 5.

The first and second holes 22 and 24 and channel void 20 are dimensioned and adapted to slidably receive an elastic wire 34 therethrough, where so engaged the elastic wire 34 generally takes on a U-shape, as illustrated in FIG. 3. While disposed in the channel void 20, that 'channel portion' of the elastic wire 34 can be covered by an inserted retainer channel 28. The retainer channel 28 covers or caps the exposed channel portion, as illustrated in FIGS. 5 and 6.

Figure 2:
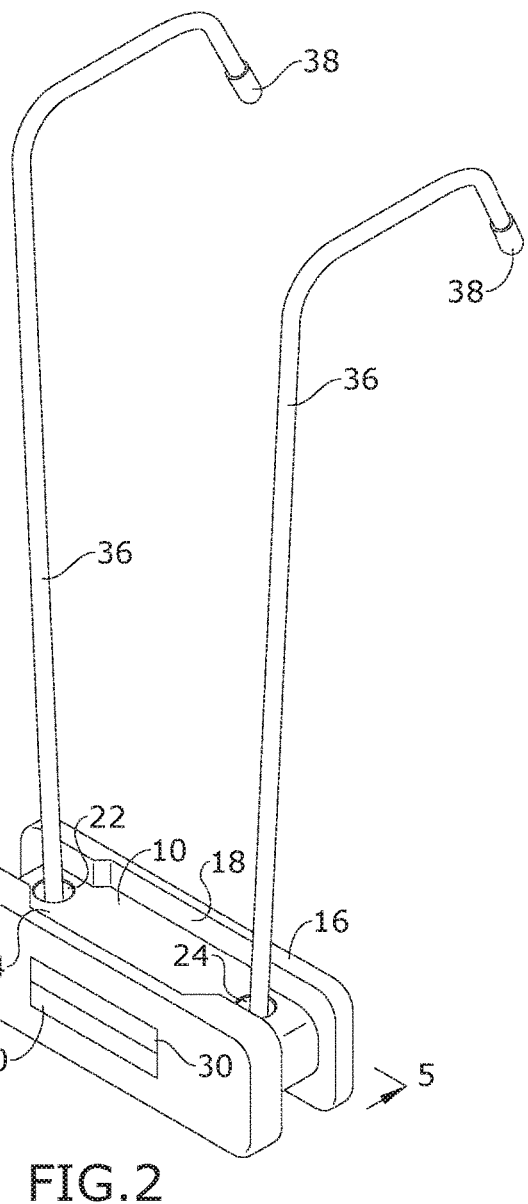
FIG. 2 is a perspective view of an exemplary embodiment of the present invention, illustrating the hanging position.

The elastic wire 34 may have a coating 36 and a wire tip cap 38 on each distal tip. The elastic wire 34 may be rigidly malleable or in other words semi-rigid yet bendable into a new shape, wherein the elastic properties hold the new shape and/or becomes biased in said new shape. In certain embodiment, the elastic wire may be 3 feet of 6-gauge rubber covered armature wire. Therefore, the distal portions of the elastic wire 34 may be formed in a hook shape, as illustrated in FIG. 2, forming the hanging position for hanging off the seatback 48 of a seat in front of the user.

Figure 7:
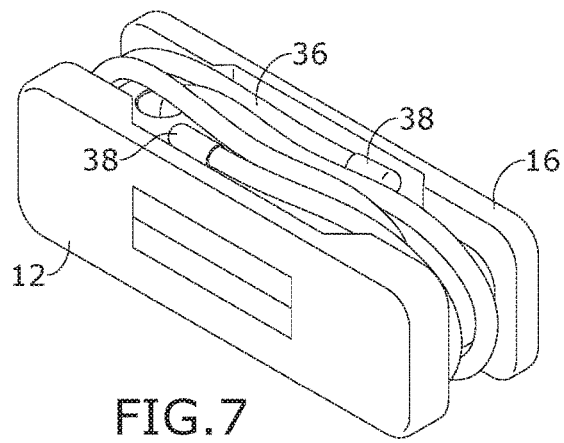
FIG. 7 is a top perspective view of an exemplary embodiment of the present invention, shown in a stored position.
Figure 8:
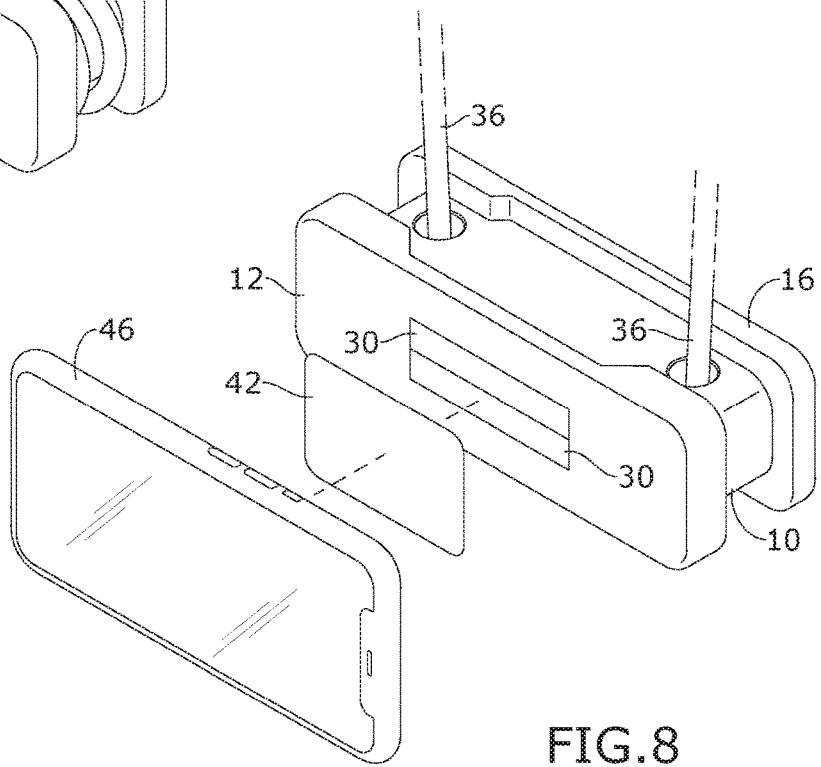
FIG. 8 is a top exploded perspective view of an exemplary embodiment of the present invention.
Figure 9:
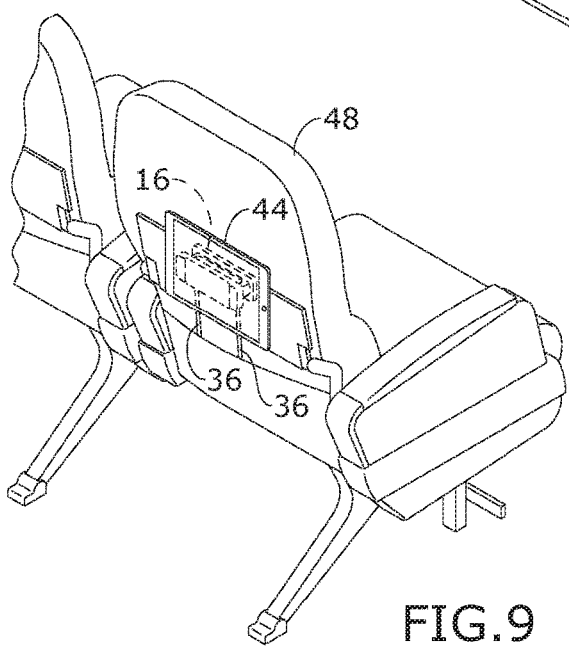
FIG. 9 is a perspective view of an exemplary embodiment of the present invention, shown in use in a propped-up position inside a seatback pocket.

Moreover, the surface area of the front and rear plates 12 and 16 may be greater than co-extensive than the front and rear sides of the core 10, as illustrated in FIG. 3. As a result, the elastic wire 34 may be wound around the core 10 so that the elastic wire 34 does not protrude from beyond a periphery of the front and rear plates 12 and 16 in the stored position, as illustrated in FIG. 7.

The front and rear plates 12 and 16 may each have a magnet slot void 26 provided along an outward-facing surface. Each magnet slot void 26 may be dimensioned and adapted to receive one or more adhesive strips 32 or glue for connecting one or more magnets 30 to an inner-most surface of the magnet slot void 26, as illustrated in FIG. 6. In certain embodiments, each of the one or more magnets 30 may be two-deep within the magnet slot void 26 while not protruding therefrom. In certain embodiments, the magnets 30 may be neodymium bar magnets having 60×10×3 mm dimensions, though other dimensions are contemplated herein.

In use, the outward-facing most magnet(s) 30 may magnetically engage a small or large ferromagnetic anchoring plate 40 or 42, which in turn magnetically or adhesively engages a small or large electronic device 46 or 44.

The personal electronic device seat retainer 100 core 10 provides the support for the electronic devices 46 or 44 when attached, it's length and height provide the support to keep the electronic devices 46 or 44 in place on the seatback 48 and allow for personal adjustment (up or down) to provide the right viewing angle.

The elastic wire 34 provides the support to hold the personal electronic device seat retainer 100 in place and at the right height for the user. The elastic wire 34 is adjustable to fit over various seatback widths. The elastic wire 34 also is rigid enough to be inverted into a seatback pocket in the propped-up position, illustrated in FIG. 9, and still provide the same capability of selecting an optimal viewing angle.

When the user is done, the elastic wire 34 can be wrapped around the core 10 in the stored position for storage. Simply put, the design of the personal electronic device seat retainer 100 is specifically designed for the ease of use and simple storage.

A method of manufacturing the present invention may include the following. The personal electronic device seat retainer 100 may be designed using 3D modeling software. The model may then be processed through a slicer for printing on a 3D printer. The 3D printer may then print the personal electronic device seat retainer 100 using 1.75 mm PLA wire. When the printing is completed, the personal electronic device seat retainer 100 may then be examined and rough areas sanded smooth. A 3-foot length of 6-gauge armature wire may be cut from a spool for use as the elastic wire 34, covered by a rubber tube/coating 36, and rubber caps 38 are placed at either end to keep the ends from causing damage. The elastic wire 34 may then be slid unto the core 10 across the bottom channel cutout 20 and through the holes 22 and 24 in the middle of the core 10 so that equal lengths of elastic wire 34 protrude out both holes 22 and 24. A 3D-printed retainer channel 28 may then be placed over the elastic wire 34 on the bottom to secure the elastic wire 34 in place.

The elastic wire 34 may then be wound around the core 10 in opposite directions so that they will rest in the core 10 central area until ready to use, in the stored position.

One or more adhesive strips 32 may be placed in the front of the personal device holder's magnet slot 26. Four magnets 30 in two rows of two magnets may then be placed in the magnet slot 26 and pressure may be applied to adhere the magnets 30 to the core 10.

A method of using the present invention may include the following. The personal electronic device seat retainer 100 disclosed above may be provided. A user may employ the personal electronic device seat retainer 100 in the hanging position for user over the seatback 48 in front of them, or inverting and placing the personal electronic device seat retainer 100 in the propped-up position in the seatback pocket of said seatback 48.

The user, after confirming all required items, may remove the paper backing (not shown) and adhere one of the adhesive strips to the back of an anchoring plate 40 or 42 to the attach to the personal electronic device 44 or 46. Then the user may unwind the elastic wire 34 so that it extends an equal length above the core 10.

If to be placed over the seatback 48, the use may request permission of the passenger in front of them to be able to put the personal electronic device seat retainer 100 behind their headrest cushions. If not, bend the wires to insert into the seatback pocket in the propped-up position. In either position, the user may selectively adjust said elastic wire 34 at an appropriate right eye level and viewing angle. Then the user may magnetically engage the anchor plate 40 or 42 to the appropriate magnets 30.

It should be understood, of course, that the foregoing relates to exemplary embodiments of the invention and that modifications may be made without departing from the spirit and scope of the invention as set forth in the following claims.

What is claimed is:

1. A retainer for securing an electronic device on a seatback, comprising:
    a cuboid core having a front surface, an upper surface, a rear surface, and a lower surface;
    two holes in the upper surface;
    a channel slot in the lower surface of the core, wherein the channel slot extends in a direction orthogonal relative to a direction of the two holes so that the two holes and the channel slot communicate to form a U-shape;
    an elastic wire disposed in the two holes and the channel slot so that the elastic wire protrudes from each hole at least one foot;
    one or more magnets attached to a front surface of the core, wherein the elastic wire has a property of taking a new shape and holding said new shape so as to be positioned in a hanging position, a propped-up position, and a stored position wound around the core;
    a rear plate directly attached to the rear surface; and
    a front plate directly attached to the front surface, wherein each perimetral edge of the front and rear plates extends beyond a perimetral edge of the front and rear surfaces, respectively, so as to define a spool structure the elastic wire wraps around in the stored position.

2. The retainer for securing an electronic device a seatback of claim 1, further comprising:
    a magnet slot provided by the front plate; and
    the one or more magnets housed in the magnet slot.

3. The retainer for securing an electronic device on a seatback of claim 2, wherein the front and rear plates are coextensive.

4. The retainer for securing an electronic device on a seatback of claim 3, further comprising:
    the one or more magnets are four magnets;
    an adhesive strip attaching a first two of the four magnets to an inner surface of the magnet slot; and
    a second two of the four magnets magnetically engaged to the first two.

5. The retainer for securing an electronic device on a seatback of claim 4, further comprising:
    a ferromagnetic anchoring plate removably engaging the second two of the four magnets and an electronic device.

6. The retainer for securing an electronic device on a seatback of claim 3, further comprising:
    two end caps, each end cap for each distal end of the elastic wire.

7. The retainer for securing an electronic device on a seatback of claim 6, further comprising:
    a retainer channel securing a portion of the elastic wire disposed in the channel slot.

8. A method of removably attaching an electronic device on a seatback in a hanging position off an upper portion of the seatback, comprising:
    providing the retainer for securing an electronic device on a seatback of claim 5;
    attaching the anchor plate to the electronic device;
    manipulating the elastic wire into the hanging position having a hook shape at each distal portion;
    engaging the hook shapes and the upper portion of the seatback; and
    adjusting the elastic wire to selectively choose a viewing angle of the electronic device.

9. The method of claim 8, further comprising:
    disengaging the hook shape and the upper portion; and
    winding the two end portions of the elastic wire about the core in opposite directions, thereby forming the stored position.

10. A method of removably attaching an electronic device on a seatback in a propped-up position in a pocket of the seatback, comprising:
    providing the retainer for securing an electronic device on a seatback of claim 5;
    attaching the anchor plate to the electronic device;
    manipulating the elastic wire into the propped-up position having a hook shape at each distal portion;
    inserting the hook shapes in the pocket; and
    adjusting the elastic wire to selectively choose a viewing angle of the electronic device.

11. The method of claim 10, further comprising:
    sliding the hook shapes out of the pocket; and
    winding the two end portions of the elastic wire about the core in opposite directions, thereby forming the stored position.

12. The retainer for securing an electronic device on a seatback of claim 7, wherein the elastic wire is covered by a rubber coating.

13. The retainer for securing an electronic device on a seatback of claim 12, wherein the channel slot is a cutout of the lower surface.

14. The retainer for securing an electronic device on a seatback of claim 13, wherein the front and rear surfaces each have a protruding bevel surface dimensioned to abut a front and rear notches, respectively, of the front and rear plates.

15. The retainer for securing an electronic device on a seatback of claim 14, wherein the cuboid core is roughly six inches by three inches by three inches.

16. The method of claim 9, wherein the entire elastic wire does not protrude from beyond a periphery of the front and rear plates in the stored position.

17. The method of claim 11, wherein the entire elastic wire does not protrude from beyond a periphery of the front and rear plates in the stored position.

* * * * *